(12) United States Patent
Sakai

(10) Patent No.: US 7,945,649 B2
(45) Date of Patent: May 17, 2011

(54) INFORMATION PROCESSING DEVICE, INFORMATION PROCESSING METHOD, AND COMPUTER-READABLE MEDIUM FOR SETTING A VALUE USED IN NETWORK COMMUNICATIONS

(75) Inventor: Masahiko Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1436 days.

(21) Appl. No.: 11/181,755

(22) Filed: Jul. 15, 2005

(65) Prior Publication Data

US 2006/0047788 A1     Mar. 2, 2006

(30) Foreign Application Priority Data

Jul. 21, 2004   (JP) ................. 2004-213017

(51) Int. Cl.
*G06F 15/177* (2006.01)
*G06F 15/173* (2006.01)
*G06F 15/16* (2006.01)
*G06F 3/00* (2006.01)

(52) U.S. Cl. ........ 709/221; 709/220; 709/222; 709/223; 709/245; 710/9

(58) Field of Classification Search .................. None
See application file for complete search history.

(56) References Cited

U.S. PATENT DOCUMENTS

| | | | |
|---|---|---|---|
| 5,402,208 A | 3/1995 | Ohmura et al. | 355/202 |
| 5,414,530 A | 5/1995 | Sakai | 358/451 |
| 5,428,458 A | 6/1995 | Aiba et al. | 358/434 |
| 5,579,130 A | 11/1996 | Sakai et al. | 358/501 |
| 5,650,862 A | 7/1997 | Shimizu et al. | 358/448 |
| 5,937,069 A | 8/1999 | Nagai et al. | 380/49 |
| 6,009,103 A * | 12/1999 | Woundy | 370/401 |
| 6,075,927 A | 6/2000 | Sakai et al. | 395/109 |
| 6,353,482 B1 | 3/2002 | Abe et al. | 358/1.15 |
| 6,757,723 B1 * | 6/2004 | O'Toole et al. | 709/222 |
| 7,370,093 B2 * | 5/2008 | Ohara | 709/220 |
| 7,443,862 B2 * | 10/2008 | Nishio | 370/395.54 |
| 7,624,164 B2 * | 11/2009 | Lu et al. | 709/220 |
| 2003/0097473 A1 * | 5/2003 | Saitoh | 709/245 |
| 2003/0126262 A1 * | 7/2003 | Yoshida et al. | 709/226 |
| 2003/0182665 A1 * | 9/2003 | Kwon | 725/111 |
| 2004/0003292 A1 * | 1/2004 | Kato | 713/201 |
| 2004/0044482 A1 * | 3/2004 | Takeda et al. | 702/19 |
| 2005/0053222 A1 * | 3/2005 | Lee et al. | 379/219 |

(Continued)

FOREIGN PATENT DOCUMENTS

JP     2001-034435     2/2001

(Continued)

OTHER PUBLICATIONS

R. Droms, Dynamic Host Configuration Protocol, Mar. 1997, Bucknell University, RFC 2131, pp. 1-45.*

*Primary Examiner* — David E England
(74) *Attorney, Agent, or Firm* — Fitzpatrick, Cella, Harper & Scinto

(57) ABSTRACT

In an information processing device according to the present invention, in the case of acquiring a setting value by using a protocol, a setting value acquired from a server by using the protocol is stored into a storage area for storing a setting value designated by a user.

10 Claims, 15 Drawing Sheets

| Enable Dhcp | 0 |
|---|---|
| IP Address | 0.0.0.0 |
| Subnet Mask | 0.0.0.0 |
| Default Gateway | 0.0.0.0 |
| Dhcp IP Address | 0.0.0.0 |
| Dhcp Subnet Mask | 0.0.0.0 |
| Dhcp Default Gateway | 0.0.0.0 |

1501     1502

U.S. PATENT DOCUMENTS

| | | | |
|---|---|---|---|
| 2005/0108547 A1 | 5/2005 | Sakai | 713/182 |
| 2005/0226209 A1* | 10/2005 | Miyahara et al. | 370/351 |
| 2006/0047788 A1* | 3/2006 | Sakai | 709/220 |
| 2006/0047791 A1* | 3/2006 | Bahl | 709/220 |
| 2006/0143702 A1* | 6/2006 | Hisada et al. | 726/15 |
| 2007/0016658 A1* | 1/2007 | Moineau et al. | 709/219 |
| 2007/0266125 A1* | 11/2007 | Lu et al. | 709/222 |
| 2007/0299942 A1* | 12/2007 | Lu et al. | 709/220 |
| 2008/0195725 A1* | 8/2008 | Ohara | 709/220 |
| 2008/0215712 A1* | 9/2008 | Ohara | 709/220 |

FOREIGN PATENT DOCUMENTS

| | | |
|---|---|---|
| JP | 2001-268095 | 9/2001 |
| JP | 2001-306474 | 11/2001 |

\* cited by examiner

INFORMATION PROCESSING DEVICE, INFORMATION PROCESSING METHOD, AND COMPUTER-READABLE MEDIUM FOR SETTING A VALUE USED IN NETWORK COMMUNICATIONS

BACKGROUND OF THE INVENTION

1. Field of the Invention

The present invention relates to an information processing device using a protocol to acquire a setting value to be used in network communication.

2. Related Background Art

A representative network protocol is Transmission Control Protocol (TCP)/Internet Protocol (IP).

TCP/IP involves layered network protocol groups, with the following standardized protocol groups: on the network level there are Internet Protocol (IP), Internet Control Message. Protocol (ICMP), Address Resolution Protocol (ARP) and the like; on the transport layer there are Transmission Control Protocol (TCP) and User Datagram Protocol (UDP).

When network communication is performed using TCP/IP protocol, it is necessary to uniquely determine logical addresses on the network, which are called IP addresses. An IP address is made of 32 bits (4 bytes), and generally they are written in 8-bit increments, such as "150.61.146.1.00" (0x963d9264).

For an information processing device to set its own IP address, the IP address can be set according to an input from a keyboard or operation panel, for example (e.g., Japanese Patent Application Laid-Open No. 2001-306474).

When the information processing device does not include a keyboard or the like, or when a user wants to manage the IP addresses of multiple information processing devices together, there is a method of using protocols called Dynamic Host Configuration Protocol (DHCP), BOOTP or RARP. The information processing device acquires the IP address from a server on the network, and sets the IP address as its own (e.g., Japanese Patent Application Laid-Open No. 2001-268095).

DHCP is a protocol defined in RFC2131, and is a protocol in which a BOOTP protocol is expanded.

Once the information processing device which serves as the DHCP client is turned on, it then sends out a DHCP Discover packet. In the case where a DHCP server is present on the network, the DHCP server sends back a response to the Discover packet.

The information processing device sends a Request packet requesting the IP address to the DHCP server which sent back the response packet. In response to that request, the DHCP server selects, from a group of IP addresses being managed by the DHCP server, an IP address that is not being used by another information processing device, and lends that IP address to the information processing device subject to a usage limit. The information processing device uses the IP address which is subject to the usage limit (lease time), and performs network communication.

When the usage limit is about to reach its end, the information processing device sends a Request packet requesting extension of use of the IP address to the DHCP server. Provided there is no problem, the DHCP server lends the IP address with a new limit.

Furthermore, when an information processing device which is a client is turned on, it makes an IP address inquiry to the DHCP server and performs the aforementioned procedure to acquire an IP address, whereby it can use the IP address to perform network communication.

In an Operating system (OS) such as Windows® for example, information about network-related operation settings is stored in a system database called a registry.

FIG. 15 is a diagram showing an example of a registry storing the operation settings information. In columns 1501 names of construction information keys are registered. In columns 1502 values corresponding to the construction information keys (below, "key values") are registered. When the key value in the Enable Dhcp registry is set to "1", the DHCP client service supplied with the OS becomes activated. When it is set to "0", the DHCP client service becomes deactivated.

When the DHCP client service has been deactivated, the IP address, the subnet mask and the gateway address which were manually set by the user are. stored as the key values in the IP Address registry, the Subnet Mask registry, and the Default Gateway registry, respectively.

When the DHCP client service has been activated, IP address, the subnet mask and the gateway address which the DHCP client service acquired automatically from the DHCP server are saved as the key values in Dhcp IP Address registry, the Dhcp Subnet Mask registry, and the Dhcp Default Gateway registry, respectively.

When the DHCP client service has been activated, the information processing device performs the network communication in accordance with the key values in the Dhcp IP Address registry, the Dhcp Subnet Mask registry, and the Dhcp Default Gateway registry, respectively. When the DHCP client service has been deactivated, network communication is performed in accordance with the key values in the IP Address registry, the Subnet Mask registry, and the Default Gateway registry, respectively.

Here, the DHCP client service supplied with the OS has a restriction that in order to activate the DHCP client service, the key values in the IP Address registry, the Subnet Mask registry and the Default Gateway registry must be "0.0.0.0".

In other words, when the key values of the IP Address registry, the Subnet Mask registry and the Default Gateway registry are other than "0.0.0.0", even if the DHCP client service is active, the DHCP parameters from the DHCP server will not be reflected in the Dhcp IP Address registry, the Dhcp Subnet Mask registry, and the Dhcp Default Gateway registry, respectively. The key values of the Dhcp IP Address registry, the Dhcp Subnet Mask registry and the Dhcp Default Gateway registry will be overwritten with the key values from the IP Address,registry, the Subnet Mask registry, and the Default Gateway registry, respectively.

Thus, once a user inactivates the DHCP client service and manually sets the IP address, the subnet mask, and the gateway address, and after that, if the user does no more than simply activate the DHCP client server, the DHCP parameters from the DHCP server will be ignored.

In order to prevent the DHCP parameters from the DHCP server from being ignored, the user by itself must manually set the IP address, the subnet mask, and the gateway address to "0.0.0.0".

Alternatively, other than a DHCP client service provided by the OS, such a new DHCP client service described above must be created.

Therefore, even in the case where the DHCP client service provided by the OS has the above-mentioned restriction, it is preferable that the settings be configured based on the DHCP parameters from the DHCP server while using the DHCP client service having the above-mentioned restrictions.

SUMMARY OF THE INVENTION

An information processing device according to the present invention includes: a first storage unit that stores a setting value designated by a user; a second storage unit that stores a setting value acquired from an external device using a protocol; a first setting unit that acquires the setting value from the external device using the protocol, and storing the setting value into the second storage unit; a network communication unit that, when the setting value acquired by the first setting unit is not to be used, performs network communication in accordance with the setting value stored in the first storage unit, and when the setting value acquired by the first setting unit is to be used, performs network communication in accordance with the setting value stored in the second storage unit; and a second setting unit that, when the setting value acquired by the first setting unit is to be used, stores the setting value from the external device into the first storage unit.

Further, an information processing device according to the present invention includes: a storage unit that stores a setting value designated by a user; an acquiring unit that acquires the setting value from an external device using a protocol; a network communication unit that, when the setting value acquired by the acquiring unit is not to be used, performs network communication in accordance with the setting value stored in the storage unit, and when the setting value acquired by the acquiring unit is to be used, performs network communication in accordance with the setting value acquired by the acquiring unit; and a setting unit that, when the setting value acquired by the acquiring unit is to be used, stores the setting value from the external device into the storage unit.

Further, an information processing method according to the present invention that is used in an information processing device that performs network communication in accordance with a setting value designated by a user and stored in a first storage area, or performs network communication in accordance with a setting value that was acquired from a server by using a protocol and is stored in a second storage area, includes the steps of: sending to the server a client-issued request using the protocol to acquire the setting value from the server and register the setting value into the second storage area; receiving from the server a response to the request; when the protocol is used, acquiring the setting value contained in the response before the response is received by the client; and registering into the first storage area the setting value received in the receiving step.

Further, an information processing method according to the present invention that is used in an information processing device that performs network communication in accordance with a setting value designated by a user and stored in a storage area, or performs network communication in accordance with a setting value acquired from a server using a protocol, includes the steps of: sending to the server a client-issued request using the protocol to acquire the setting value from the server; receiving from the server a response to the request; when the protocol is used, acquiring the setting value contained in the response before the response is received by the client; and registering into the storage area the setting value received in the receiving step.

Further, a computer program according to the present invention controls a computer having a client program that uses a protocol to acquire a setting value from a server and including a first storage area for storing a setting value designated by a user, and a second storage area for storing the setting value acquired by the client program, to operate the following processing: acquiring a response to a request issued by the client program before the response is received by the client program; and storing a setting value contained in the response, into the first storage area.

DETAILED DESCRIPTION OF THE PREFERRED EMBODIMENTS

First Embodiment

Figure 1:
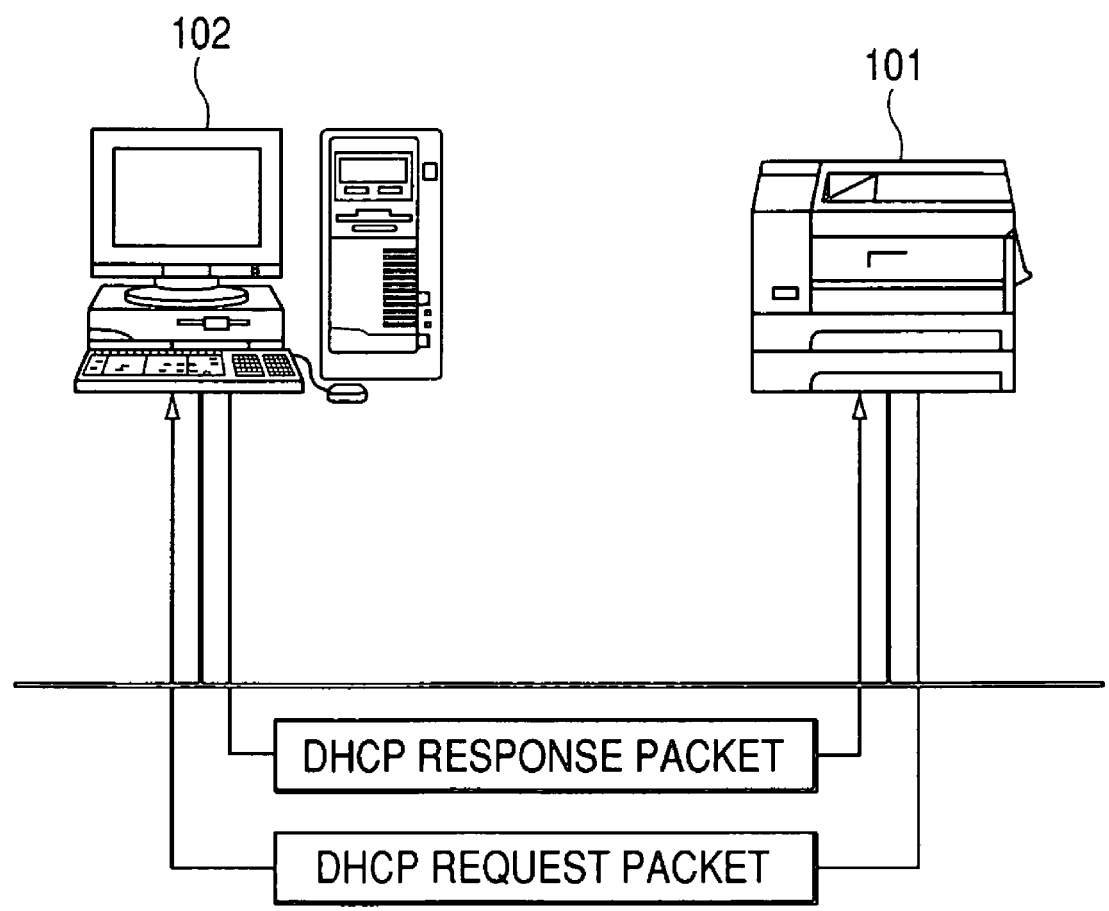
FIG. 1 shows a network system including a network device and a personal computer (PC)

Hereinafter, detailed explanation is given regarding a preferable embodiment of the present invention, with reference given to the attached drawings. FIG. 1 is a diagram showing a network system including a network device and a personal computer (PC).

Reference numeral 100 denotes a local area network (LAN). The LAN 100 or other such LAN network provides service to somewhat local groups, such as a single floor with in a single building, or a user group located on multiple consecutive floors. For example, when the user is in another building, a wide area network (WAN) may be used depending on the distance between users. The WAN is basically an aggregation formed by connecting multiple LANs together with a high speed Integrated Services Digital Network (ISDN) telephone or other such high speed digital lines.

Reference numeral 101 denotes a network device. The network device 101 is an example of an information processing device connected to the local area network (LAN) 100. The connection to the LAN is made via an interface such as a 10 base-T having RF-45.

Reference numeral 102 denotes a personal computer (PC). The PC 102 is connected to the LAN 100, and can communicate with the network device 101 via the LAN 100. A Dynamic Host Configuration Protocol (DHCP) server program is operating on the PC 102, and manages IP addresses that can be allotted to one or multiple network devices connected to the LAN 100.

When the network device 101 sends out a DHCP request packet over the LAN 100, the PC 102 sends out a DHCP response packet in response to the DHCP request packet. The network device 101 configures settings based on the information included in this DHCP response packet.

Figure 2:
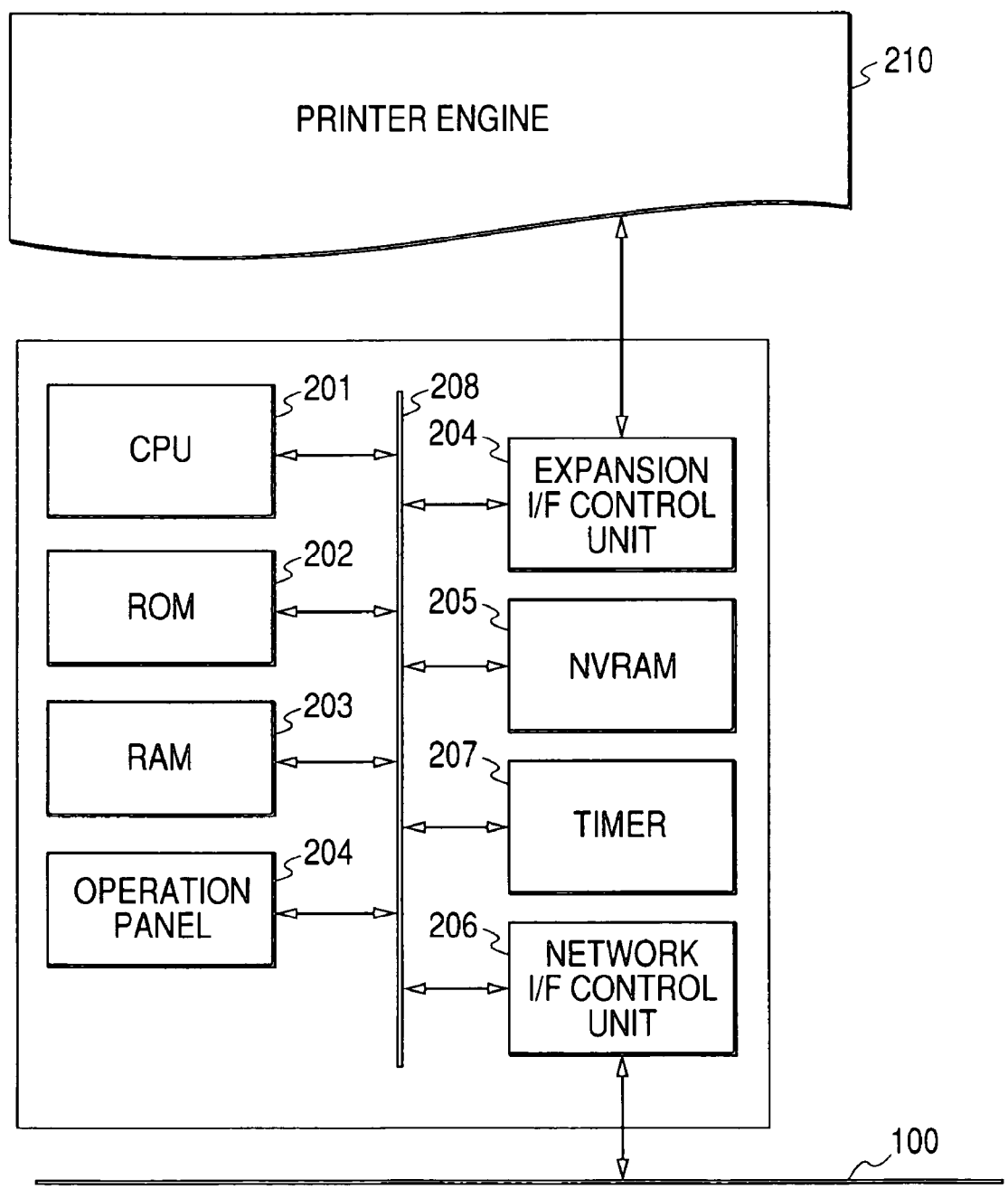
FIG. 2 is a block diagram showing an internal construction of a network device 101.

FIG. 2 is a block diagram showing an internal construction of the network device 101. Here, as an example of the network device 101, explanation is given regarding a network printer. Note that instead of a network printer, the network device 101 may be a personal computer, a host computer, a workstation, a copier, a multi-task machine, or the like.

The CPU 201 performs control on the entire device in accordance with a software program for the network device 101. The ROM 202 is a read only memory, and stores the device's boot program, fixed parameters, and the like. The RAM 203 is a random access memory, and stores data temporarily used for the CPU 201 to control the device.

An expansion I/F control unit 204 controls an I/F to a printer engine 210. Note that, provided that the expansion I/F control unit 204 is a device that can be controlled, then it does not have to be the printer engine. Any facsimile, scanner, copier, multi-task machine, or the like could be connected instead.

Figure 15:
FIG. 15 is a diagram showing an example of registries storing operation setting information.

An NVRAM 205 is a non-volatile memory, and saves various setting values for the network device 101. Registries shown in FIG. 15 are secured in the NVRAM 205. Note that when the network device 101 is a personal computer or a host computer, the registries may be secured on a hard disk. A network I/F control unit 206 controls sending and receiving of data to and from the LAN 100. A timer 207 keeps track of natural time, or chronological increments.

A bus 208 is a system bus for connecting the CPU 201, the ROM 202, the RAM 203, the expansion I/F control unit 204, the NVRAM 205, the network I/F control unit 206, and the timer 207, and forwarding control signals from the CPU 201 and data signals to and from each unit.

The operation panel 209 displays various types of information, and is used to input operation instructions from the user. In the case where the network device 101 is a personal computer or host computer, the operation panel 209 is replaced with a display and keyboard. The print engine 210 performs printing based on print data sent from the expansion I/F control unit 204.

Figure 3:
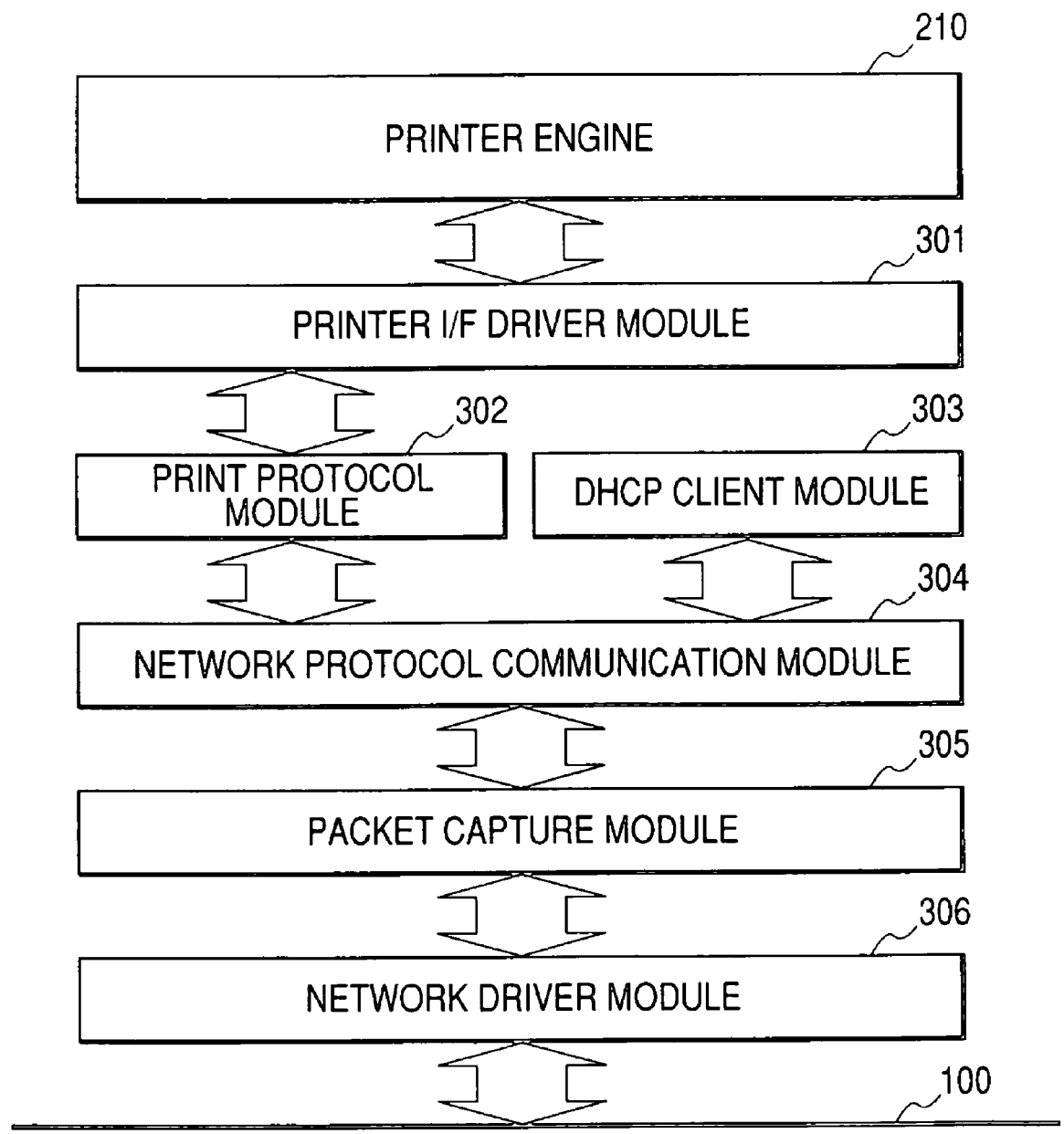
FIG. 3 is a block diagram showing a program construction of the network device 101.

FIG. 3 is a block diagram showing a program construction of the network device 101. Various modules in FIG. 3 are executed by one or multiple CPUs (for example, CPU 201) of the network device 101.

Reference numeral 301 is a printer I/F driver module, which controls the expansion I/F control unit 204 and performs sending and receiving of data to and from the printer engine 210. Reference numeral 302 is a print plot control module, which supports general use print protocol on the network.

Reference numeral 303 is a DHCP client module provided by the operating system (OS). This DHCP client module corresponds to the DHCP client service provided by the OS. Reference numeral 304 is a network protocol communications module for performing network communication controls.

Reference numeral 305 is a packet capture module for capturing packets between a network driver module 306 and the network protocol communication module 304. Reference numeral 306 is the network driver module, which controls the network I/F control unit 206, which is a routine of actually sending out the packets on the LAN 100 and receiving the packets from the LAN 100.

The print protocol module 302 follows a print communication sequence determined by the protocol, and uses the network protocol communication module 304 to receive print data from the network. The received print data is sent to the print engine 210 via the printer I/F driver module 301.

The packet capture module 305 captures the packets sent received from the network driver module 306, executes various processing based on the captured packets, and then sends the packets to the network protocol communication module 304.

Figure 4:
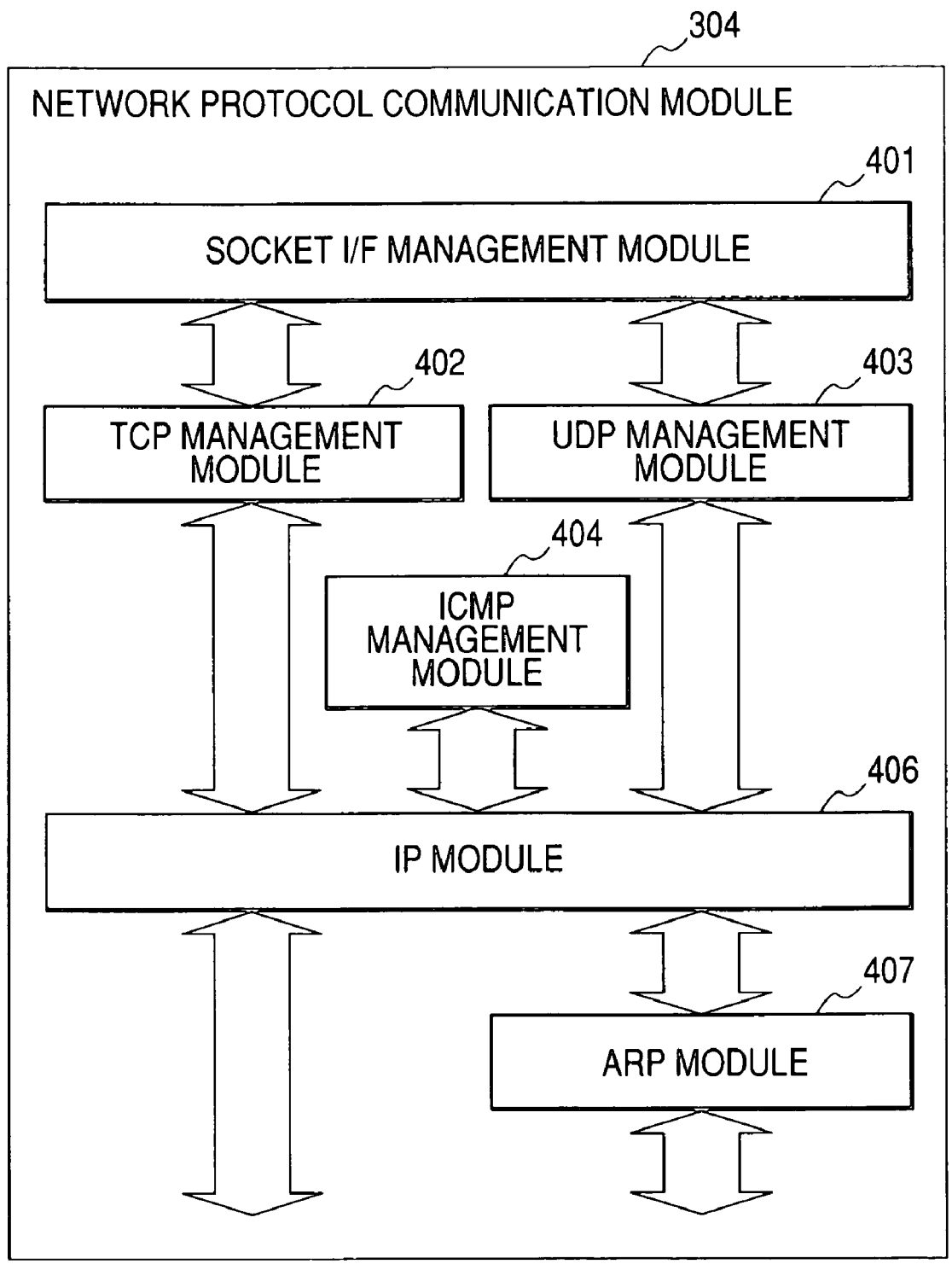
FIG. 4 is a block diagram showing a program construction in a network protocol communication module 304.

FIG. 4 is a block diagram showing a program construction in the network protocol communication module 304.

Reference numeral 401 is a socket interface management module, which provides an interface called a "socket" to the print protocol module 302 and the DHCP client module 303. By using the socket interface, the print protocol module 302 and the DHCP client module 303 can easily perform communication with an external unit by using TCP/IP protocol.

Reference numeral 402 is a TCP management module. Furthermore, reference numeral 403 is a UDP management module. The TCP management module 402 processes Transmission Control Protocol (TCP) protocol, and the UDP management module 403 processes User Datagram Protocol (UDP) protocol. The TCP management module and the UDP management module use the IP module 406 to perform communication with the external unit.

Reference numeral 404 is an ICMP management module, which processes Internet Control Message Protocol (ICMP) protocol. Reference numeral 406 is an IP module, which processes Internet Protocol (IP) protocol. Reference numeral 407 is an ARP module, which processes Address Resolution Protocol (ARP) protocol.

Figure 5:
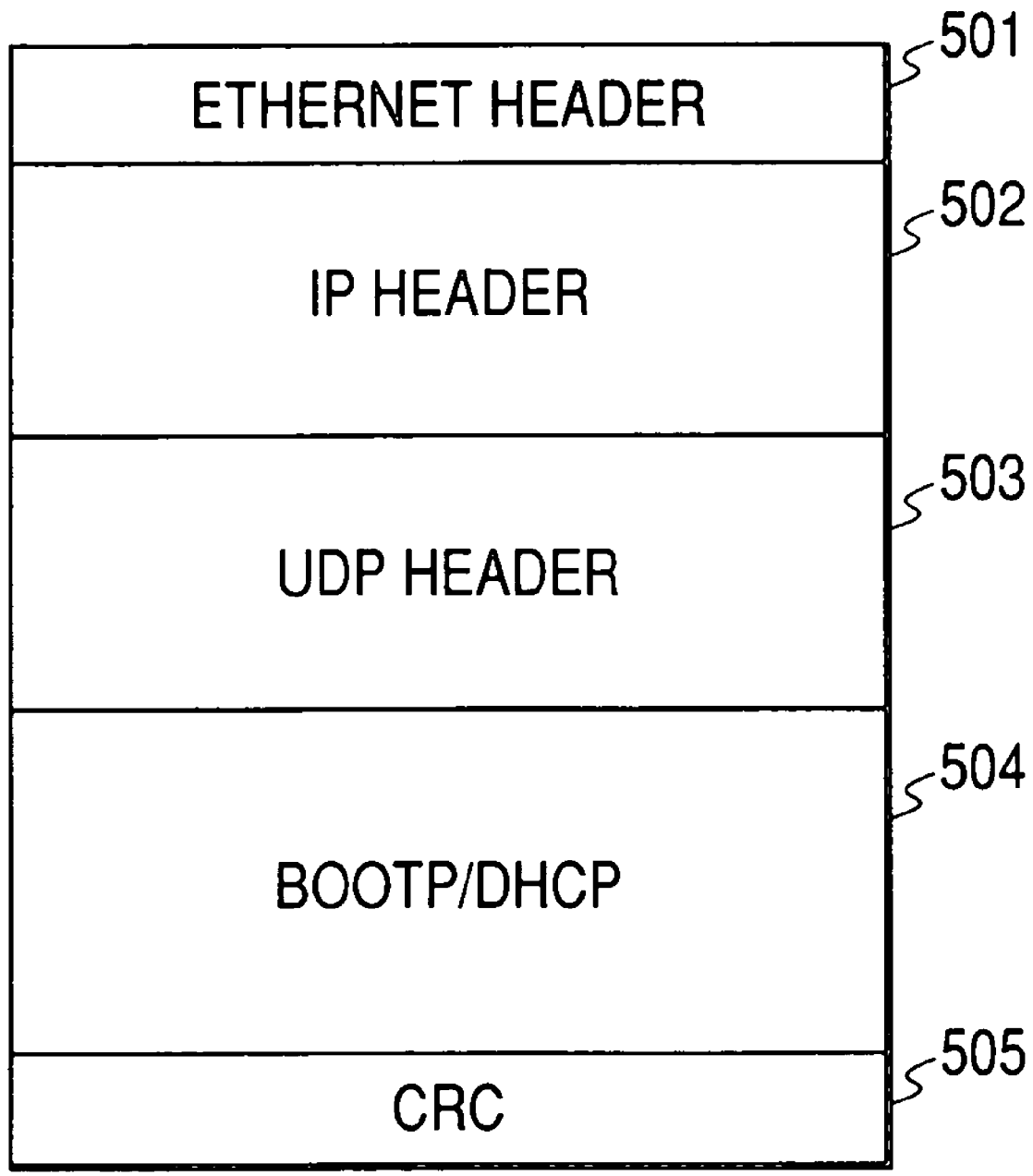
FIG. 5 is a diagram showing a frame construction of a DHCP packet.

FIG. 5 is a diagram showing a frame construction of a DHCP packet. The DHCP packet is constructed with an Ethernet® header 501, an IP header 502, a UDP header 503, and a BOOTP/DHCP message 504. Additionally, CRC 505 is added to the end of the frame.

Figure 6:
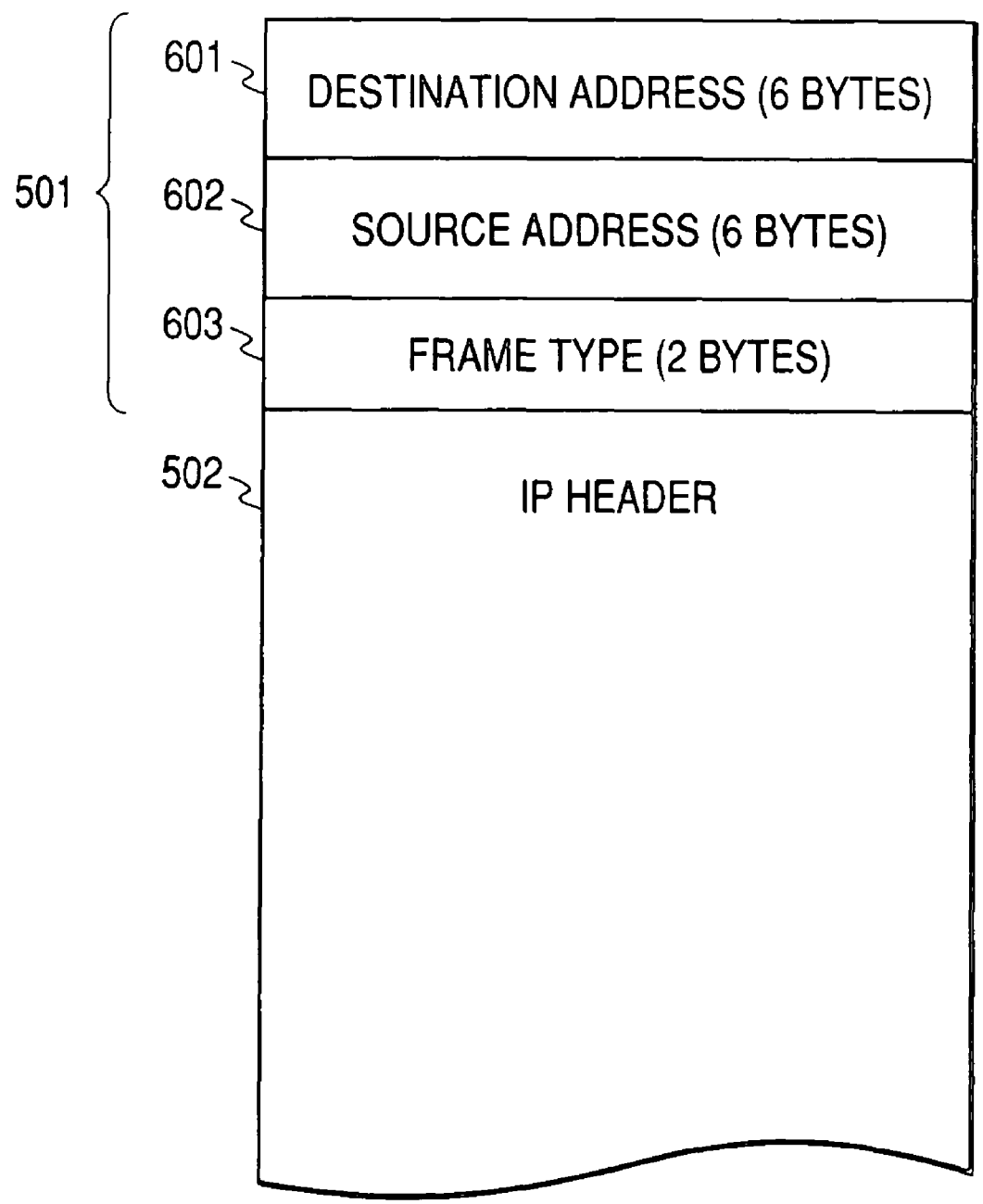
FIG. 6 is a diagram showing a construction of an Ethernet® header 501.

FIG. 6 is a diagram showing a construction of the Ethernet® header 501. In FIG. 6, the packet is sent and received in Ethernet® II format. Reference numeral 601 denotes a destination address. Reference numeral 602 denotes a source address. Reference numeral 603 denotes a frame type.

The destination address 601 and the source address 602 store Media Access Control (MAC) addresses that are unique to the machines. Here, the MAC addresses refer to a physical address that is unique to the machine. In the case of Ethernet®, the length is 6 bytes, and the first 3 bytes serve as a vendor code which is managed and assigned by American Institute of Electrical and Electronic Engineers (IEEE). The remaining 3 bytes are code which each vender manages (so there is no overlap) on their own. Thus, in the entire world there are no network machines which have the same physical address, and different addresses are assigned to all of them.

The frame type 603 is fixed as 0×0800 in the case of IP, and 0×0806 in the case of ARP.

Figure 7:
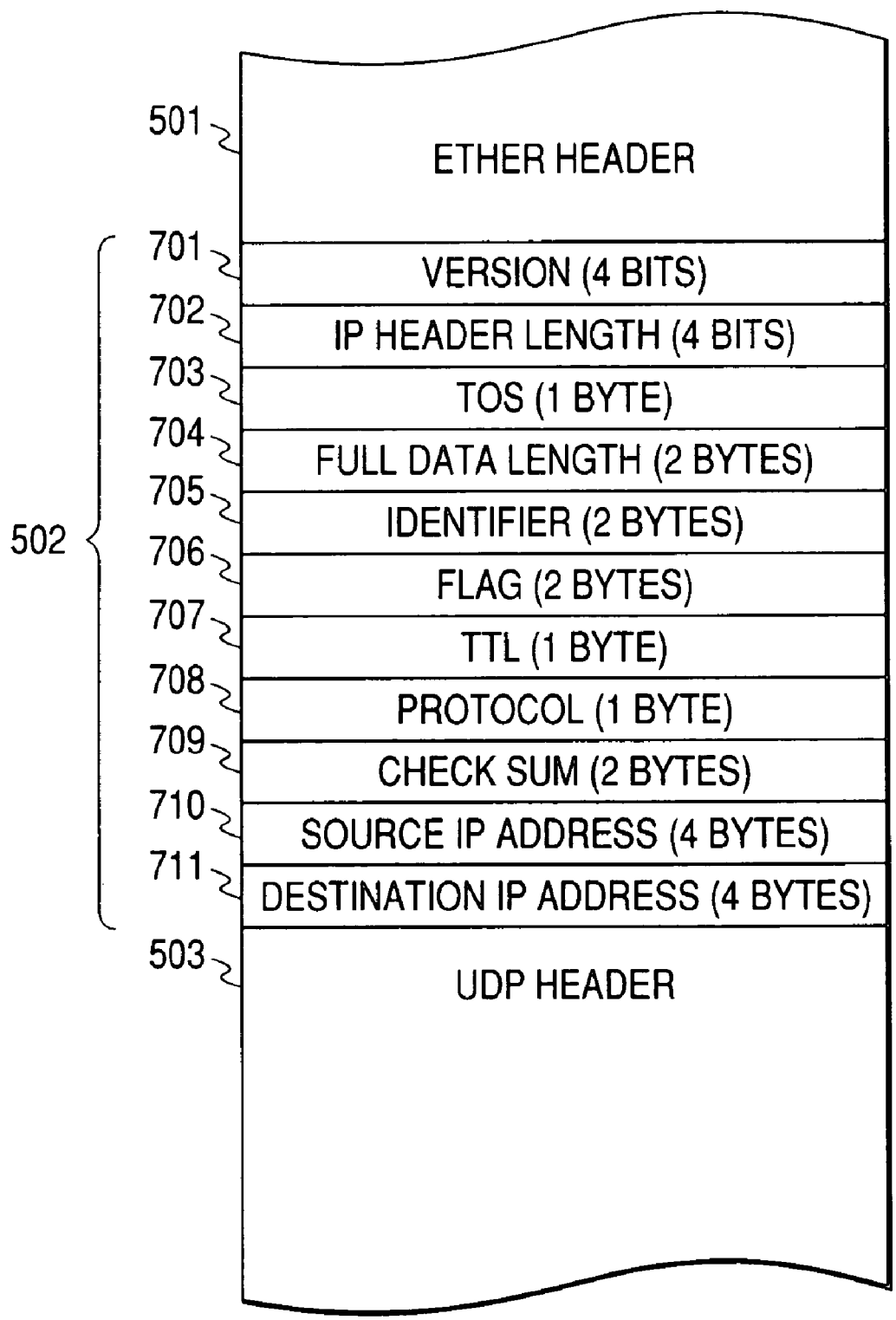
FIG. 7 is a diagram showing a construction of an IP header 502.

FIG. 7 is a diagram showing a construction of the IP header 502. Reference numeral 701 is an IP version. Reference numeral 702 is a length of the IP header. Reference numeral 703 is a service type (Type of Service: TOS). Reference numeral 704 is a full data length. Reference numeral 705 is an identifier. Reference numeral 706 is a flag field. Reference numeral 707 is a longevity field. Reference numeral 708 is a protocol identifier. Reference numeral 709 is an IP header checksum. Reference numeral 710 is an IP address of the source. Reference numeral 711 is an IP address of the destination.

Figure 8:
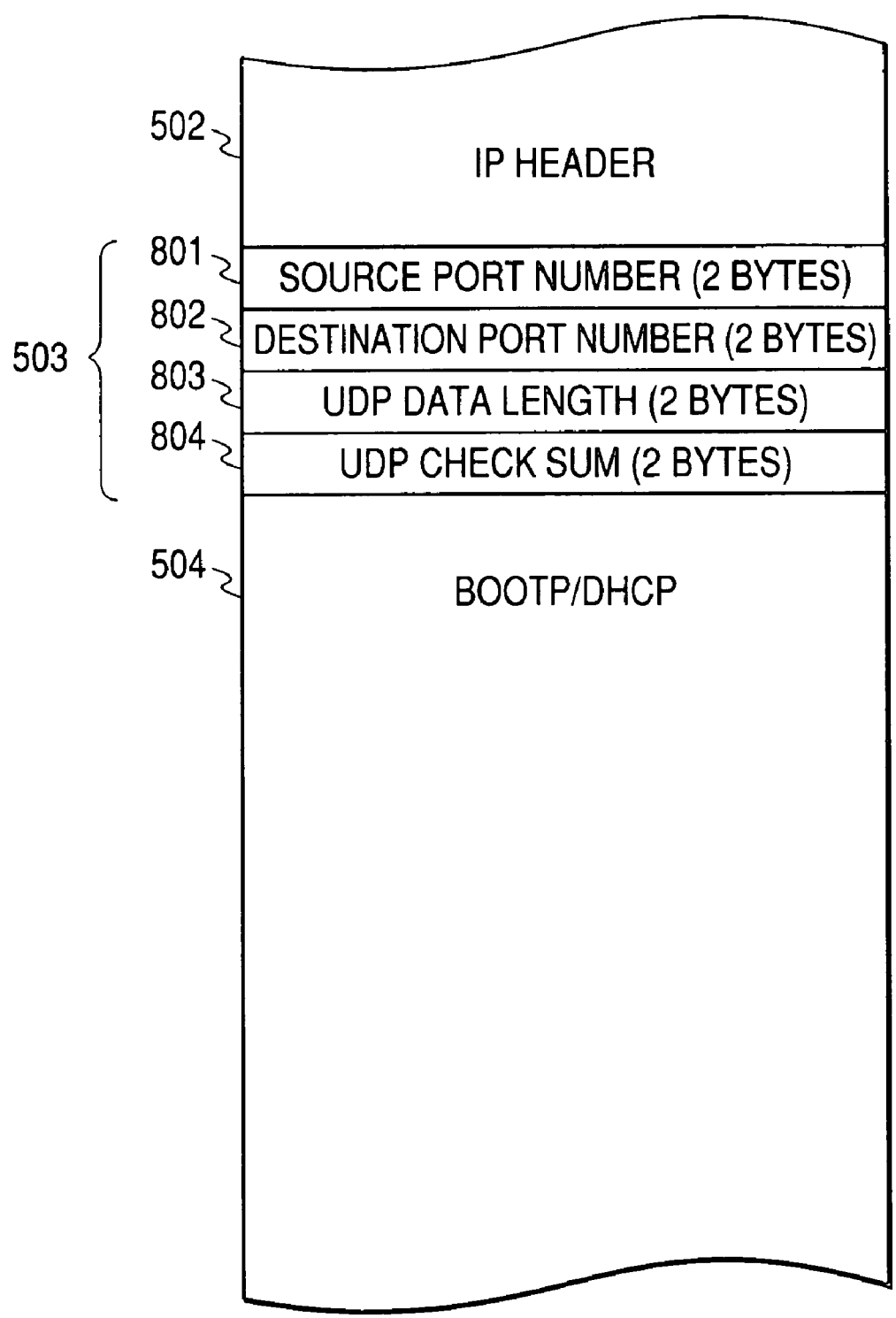
FIG. 8 is a diagram showing a construction of a UPD header 503.

FIG. 8 is a diagram showing a construction of the UDP header 503. Reference numeral 801 is a port number of the source. Reference numeral 802 is a port number of the destination. Reference numeral 803 is a UDP data length, and reference numeral 804 is a UDP checksum.

Figure 9:
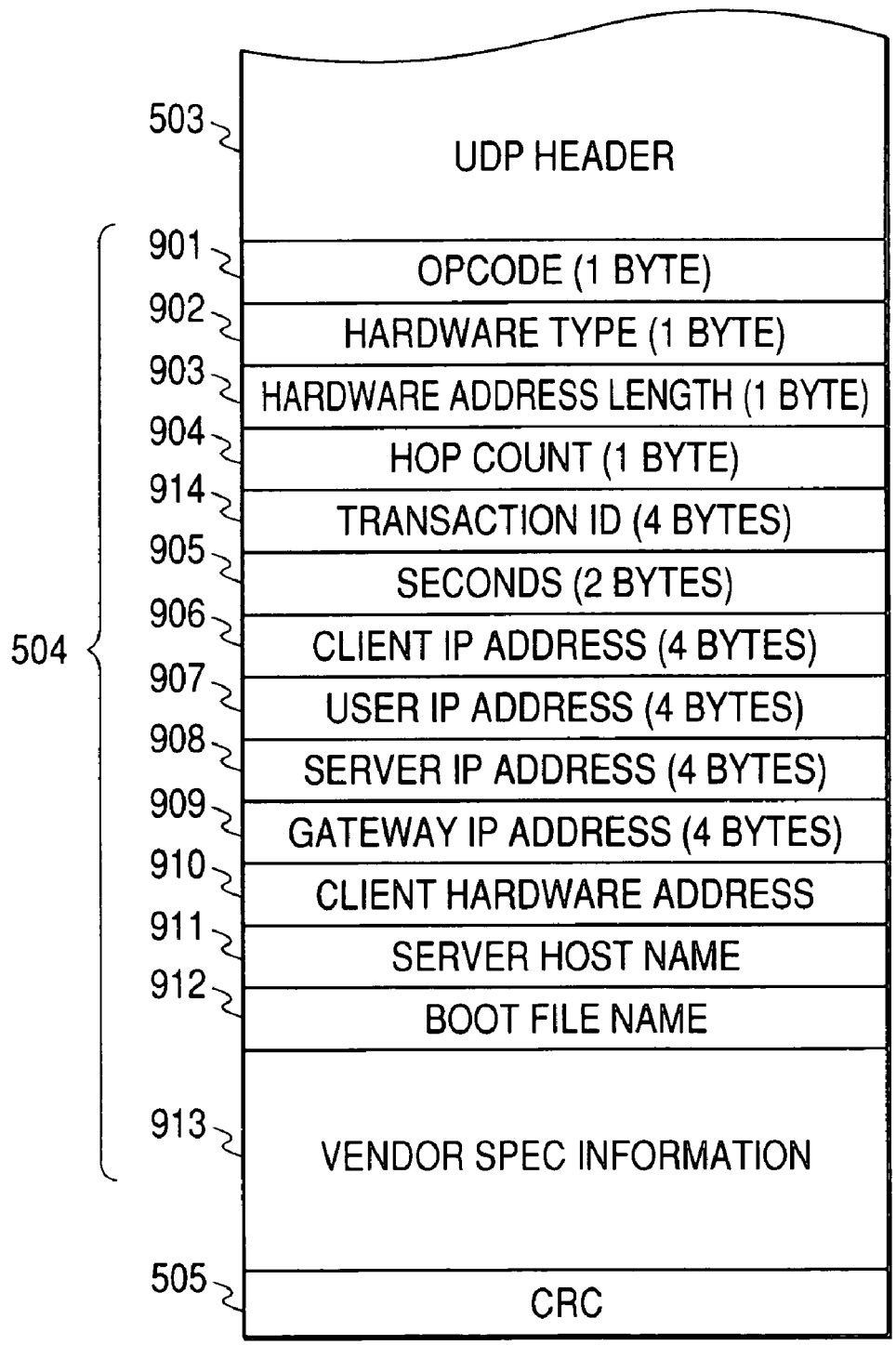
FIG. 9 is a diagram showing a construction of a DHCP (BOOTP) message 504.

FIG. 9 is a diagram showing a construction of the DHCP (BOOTP) message 504. Reference numeral 901 is an opcode. Reference numeral 902 is a hardware type. Reference numeral 903 is a hardware address length. Reference numeral 904 is a hop count. Reference numeral 905 is a number of seconds. Reference numeral 906 is a client IP address. Reference numeral 907 is a user IP address. Reference numeral 908 is a server IP address. Reference numeral 909 is a gateway IP address. Reference numeral 910 is a client hardware address. Reference numeral 911 is a server host name. Reference numeral 912 is a boot file name. Reference numeral 913 is vendor specification information. Reference numeral 914 is a transaction ID.

The opcode 901 is an identifier for identifying whether a packet is a request or a response. Here, "1" is used for the hardware type 902. The hardware address length 903 is the hardware length, and here it is "6". The hop count 904, the transaction ID 914, the number of seconds 905, the client IP address 906, and the user IP address 907 are given by the DHCP server.

Figure 10:
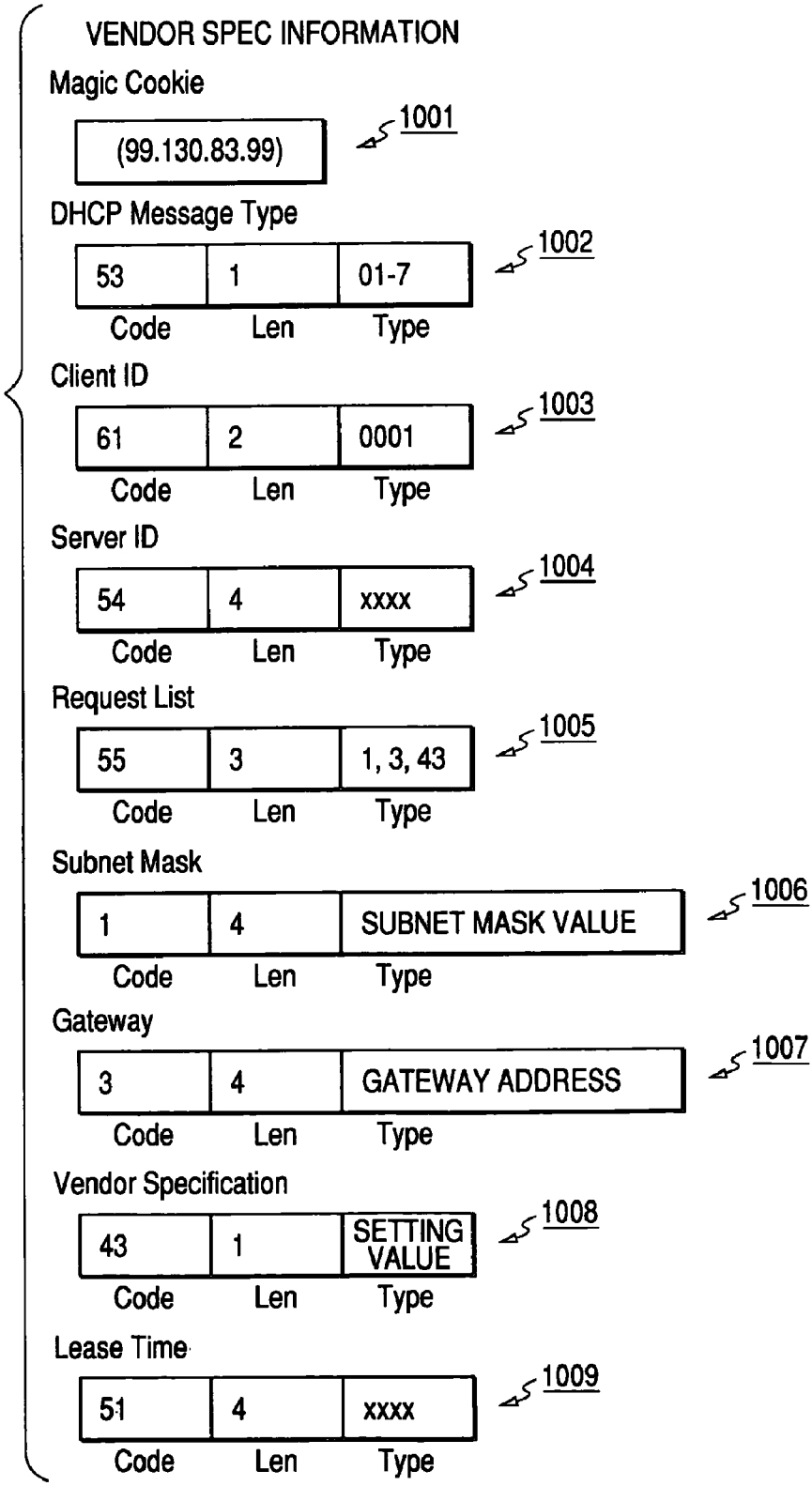
FIG. 10 is a diagram showing details of vendor specification information 913.

FIG. 10 is a diagram showing in detail the vendor specifications information 913. Various information can be stored in this vendor specifications information.

In the case of DHCP, the first 4 bytes store 4-byte data (99.130.83.99) called a "Magic Cookie" (1001). The following data store code, length and type data, in that sequence.

DHCP Message Type (1002) shows whether the packet is a DHCP packet request or response. Its code is 53 bytes, and the length is 1 byte. It stores one of the following types:

(1) DHCP DISCOVER
(2) DHCP OFFER
(3) DHCP REQUEST
(4) DHCP DECLINE
(5) DHCP ACK
(6) DHCP NACK
(7) DHCP RELEASE

A Client ID (1003) is an ID for identifying the DHCP client. Its code is 61 bytes, the length is 2 bytes, and the type is 0001. A Server ID (1004) is an ID of the DHCP server which is uniquely determined by the DHCP server. Its code is 54 bytes, its length is 4 bytes, and the type stores a 4-byte ID.

A Request List (1005) shows a list of information necessary for the DHCP client service. Its code is 55 bytes, its length is 3 bytes, and the type stores the codes of required information. Here, the data required by the DHCP client service is a Subnet Mask (1006), a Gateway (1007), and a Vendor Specification (1008).

The Subnet Mask (1006) shows a subnet mask value, which is one setting parameter of the network device 101. Its code is 1 byte, its length is 4 bytes, and the type stores the subnet mask value.

The Gateway (1007) shows a gateway address, which is one setting parameter of the network device 101. Its code is 1 byte, its length is 4 bytes, and the type stores the subnet mask value.

The Vendor Specification (1008) shows information that is unique to the vendor. Its code is 43 bytes, its length is 1 byte, and the type stores the setting value. The network device 101 follows this setting value, and uses the DHCP protocol and judges whether or not to resolve the IP address each time the power supply is turned on.

A Lease Time shows usage limit of the IP address. Its code is 51 bytes, its length is 4 bytes, and the type stores the usage limit.

Figure 11:
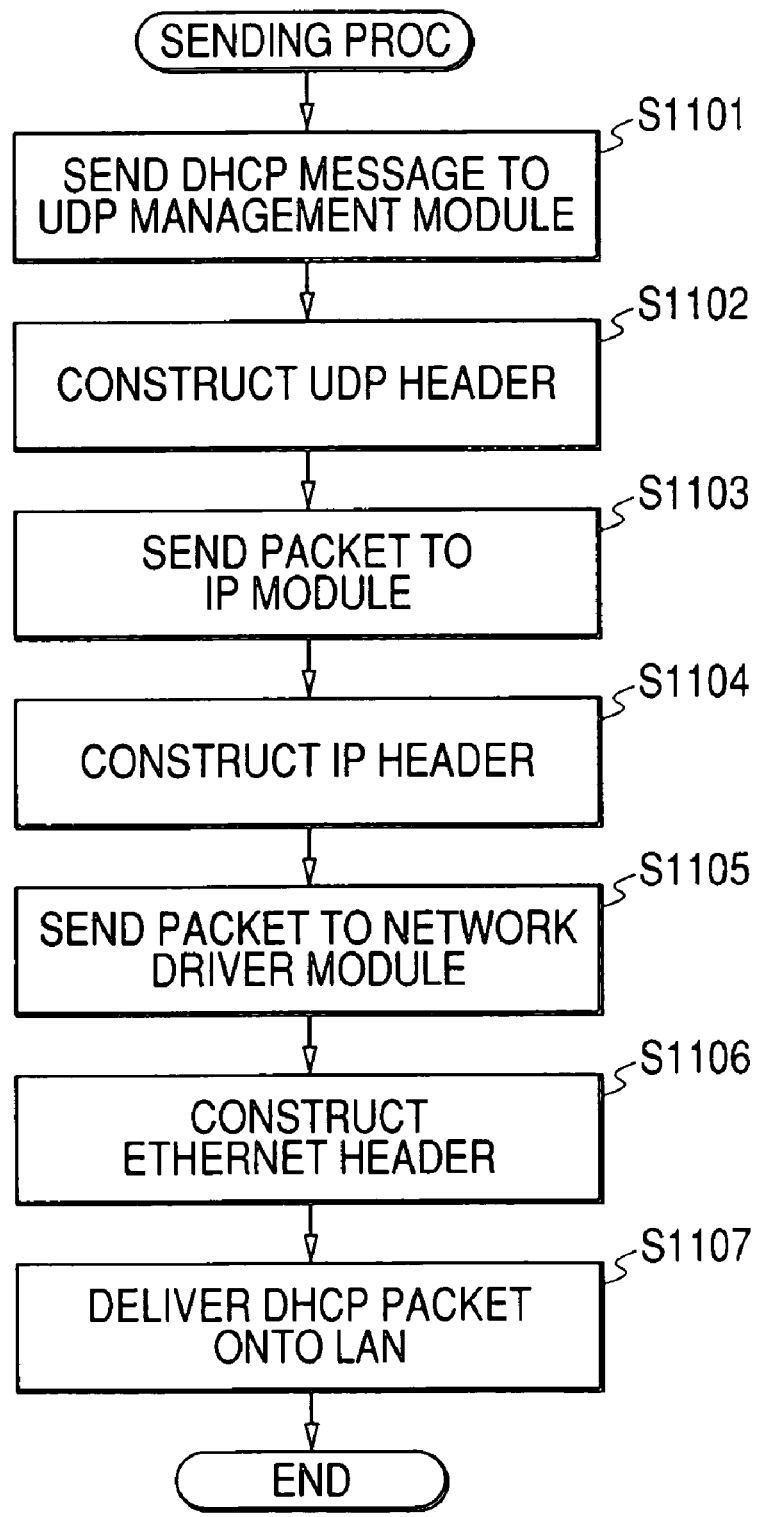
FIG. 11 is a flowchart showing DHCP packet sending processing.

Hereinafter, explanation is given regarding the flow of processing of the DHCP packet. FIG. 11 is a flowchart showing DHCP packet sending processing. This processing is executed in accordance with the modules in FIGS. 3 and 4.

The DHCP message constructed by the DHCP client module 303 is sent to the UDP management module 403 via the socket interface management module 401 of the network protocol communication module 304 (step S1101). Note that, when the key value in the Enable DHCP registry is set to "1", the DHCP client module 303 sends the DHCP message to the UDP management module 403. Here, when the DHCP parameters are acquired from the DHCP server, the DHCP client module 303 sends a DHCP message with "DHCP REQUEST" designated in the DHCP Message Type (1002) to the UDP management module 403.

The UDP management module 403 constructs a UDP header, in which a port number "68" corresponding to the DHCP client is stored in the source port number 801, and port number "67" corresponding to the DHCP server is stored in the destination port number 802 (step S1102). Furthermore, the UDP management module 403 sets a value into the UDP length 803, calculates the checksum, and then stores the data resulting from the calculation into the UDP checksum 804.

Finally, the UDP management module 403 sends the packet, which has been thus constructed from the created UDP header and the DHCP message, to the IP module 406 (step S1103).

In the IP module 406, the IP header parameters shown in FIG. 7 are each set to construct the IP header (step S1104). In the DHCP protocol, when the packet is sent from the DHCP client side, the source IP address 710 is set to "0.0.0.0", and the destination IP address 711 is set to "255.255.255.255".

Finally, the IP module 406 sends the packet constructed from the created IP header, UDP header and DHCP message, to the network driver module 306 (step S1105).

The network driver module 306 sets the parameters of the Ethernet® header shown in FIG. 6, and constructs the Ethernet® header (step S1106). The protocol type is set to "0x0800", which shows that the protocol is IP. This is because the packet is a send request from the IP module 406. Furthermore, the source address 602 is set to the MAC address of the network device 101, and the destination address 601 is set to "0x ffffffffffff".

Finally, the network driver module 306 sends the DHCP packet, which is made from the created Ethernet® header, IP header, UDP header and DHCP message, over the LAN 100 through the network I/F control unit 206 (step S1107). At this time, the CRC code (505) is attached to the end of the packet.

Figure 12:
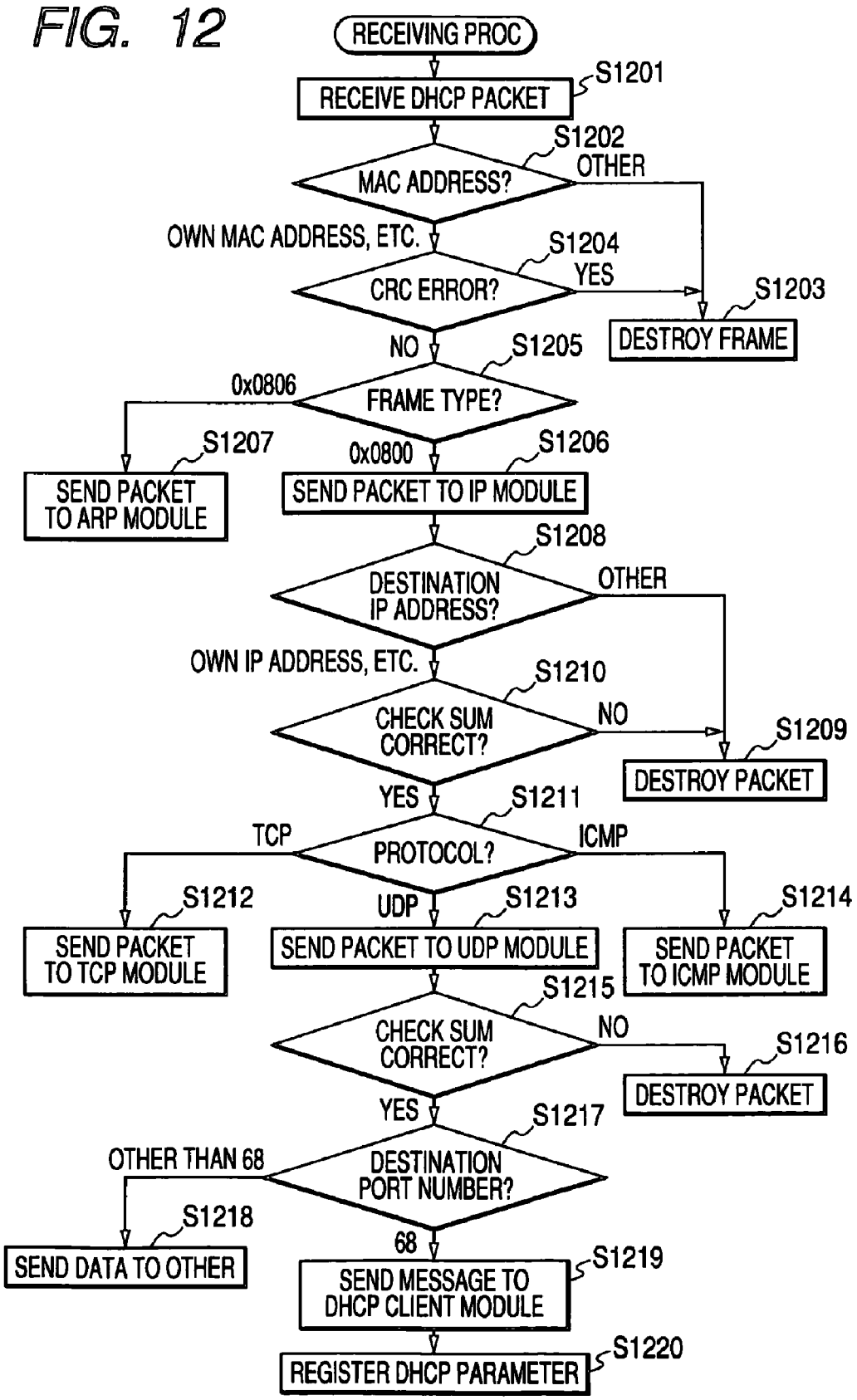
FIG. 12 is a flowchart showing DHCP packet receiving processing.

FIG. 12 is a flowchart showing DHCP packet receiving processing. This processing is executed by the various modules shown in FIG. 3.

First, the network driver module 306 receives the DHCP packet as the Ethernet® frame shown in FIG. 5, via the network I/F control unit 206 (step S1201).

The network driver module 306 analyzes the frame Ethernet® header, and judges whether or not the destination address 601 shows at least one of the MAC address of the network device 101, the broadcast address, and the multicast address registered in the network device 101 (step S1202). When the destination address 601 is none of these, the network driver module 306 destroys the frame (step S1203). Furthermore, the network driver module 306 also judges whether the frame caused an error (step S1204). When the CRC did cause an error, the module destroys the frame (step S1203).

Next, the network driver module 306 confirms the frame type 603 (step S1205). When the frame type 603 indicates "0x0800", the network driver module 306 judges that the subsequent byte stream is an IP packet, and transfers the IP packet to the IP module 406 in the network protocol communication module 304 (step S1206). When the frame type 603 indicates "0x0806", the network driver module 306 judges that the packet is an ARP packet, and transfers the ARP packet to the ARP module 407 (step S1207).

The IP module 406 analyzes the IP header of the IP packet received from the network driver module 306, and judges whether or not the destination IP address 711 shows at least one of the IP address of the network device 101, the broadcast address, and the multicast address registered in the network device 101 (step S1208).

In the case where none of those are shown, the IP module 406 destroys the IP packet (step S1209). Furthermore, the IP module 406 judges whether or not the checksum is correct (step S1210). When the checksum is incorrect, the module destroys the IP packet (step S1209).

Next, the IP module 406 confirms the protocol identifier 708 (step S1211). When the protocol identifier 708 indicates TCP, the packet is transferred to the TCP management module 402 (step S1212). When the protocol identifier 708 indicates UDP, IP module 406 transfers the packet to the UDP management module 403 (step S1213). When the protocol identifier 708 indicates ICMP, IP module 406 transfers the packet to the ICMP management module 404 (step S1214).

Here, the step. S1213 and subsequent steps are explained with focus given to the case where the packet is the DHCP packet. When the UDP management module 403 receives the packet from the IP module 406, the UDP management module 403 performs analysis of the UDP header shown in FIG. 8 and checks the UDP checksum 804 (step S1215). When the checksum is incorrect, the packet is destroyed (step S1216).

After that, the UDP management module 403 confirms the UDP port number 802 (step S1217). When the destination port number 802 indicates "68", the UDP management module 403 transfers the DHCP message to the DHCP client module 303, through the socket interface management module 401 (step S1219). When the destination port number 802 indicates other than "68", UDP management module 403 transfers the packet to another module (step S1218).

The DHCP client module 303 registers the DHCP parameter values into the registries, based on the DHCP message shown in FIG. 9 or 10 (step S1220). The DHCP client module 303 registers the user IP address 908 shown in FIG. 9 as the key value in the Dhcp IP Address registry. Furthermore, the subnet mask value in FIG. 10 is registered as the key value in the Dhcp Subnet Mask registry. Furthermore, the gateway address in FIG. 10 is registered as the key value in the Dhcp Default Gateway registry.

However, when the key values of the IP Address registry, the Subnet Mask registry and the Default Gateway registry are other than "0.0.0.0", even if the Enable DHCP registry key value is "1", the DHCP client module 303 does not register the DHCP parameters into the Dhcp IP Address registry, the Dhcp Subnet Mask registry, or the Dhcp Default Gateway registry. Then, even if the DHCP client module 303 does register them, the key values in the Dhcp IP Address registry, the Dhcp Subnet Mask registry and the Dhcp Default Gateway registry will be written over with the key values from the IP Address registry, the Subnet Mask registry, and the Default Gateway registry, respectively.

Figure 13:
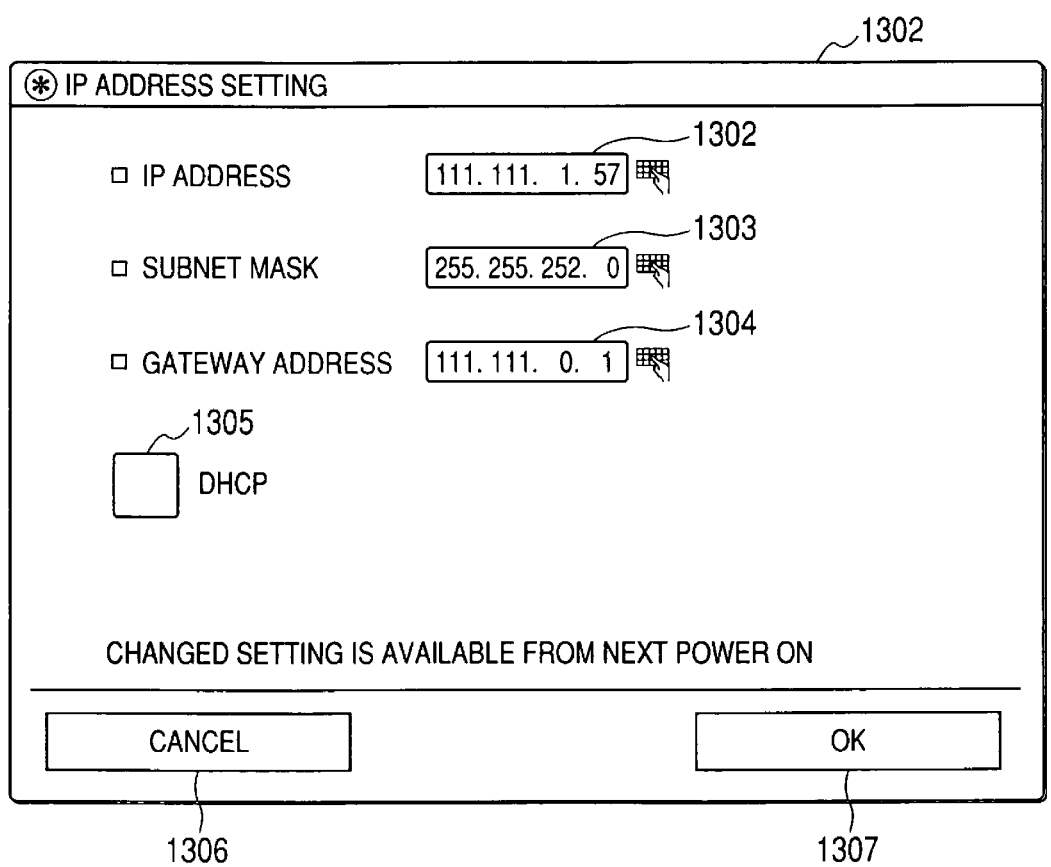
FIG. 13 is a diagram showing an example of a network setting screen, which the network device 101 displays on an operation panel 209.

FIG. 13 is a diagram showing an example of a network setting screen, which the network device 101 displays on the display panel 209. The network setting screen 1301 has an area 1302 for inputting the IP address of the network device 101, an area 1303 for inputting the subnet mask of the network device 101, an area 1304 for inputting the gateway address of the network device 101, a DHCP button 1305 for switching between activation and deactivation of the DHCP client service, an OK button 1306 for confirming the inputs, and a cancel button 1307 for canceling the inputs.

In the case of a network setting screen shown in FIG. 13, there is one settings menu for the IP address, the subnet mask and the gateway address. Therefore, when the DHCP button 1305 is turned on (when the DHCP client service is activated) the key values in the Dhcp IP Address registry, the Dhcp Subnet Mask registry and the Dhcp Default Gateway registry are each referenced, and the IP address, subnet mask and gateway address acquired by the DHCP client service from the DHCP server are each displayed.

Furthermore, when the DHCP button is turned off (when the DHCP client service is deactivated), the IP address, subnet mask and gateway address values inputted by the user are saved in the IP Address, Subnet Mask and Default Gateway registries, respectively.

Hereinafter, explanation is given regarding processing executed by the packet capture module 305. In the case where the IP Address registry, the Subnet Mask registry or the Default Gateway registry key values are other than "0.0.0.0", even if the DHCP client service is activated, the DHCP parameters from the DHCP server are ignored. Therefore, the packet capture module 305 performs the following processing to prevent the DHCP parameters from being ignored.

Figure 14:
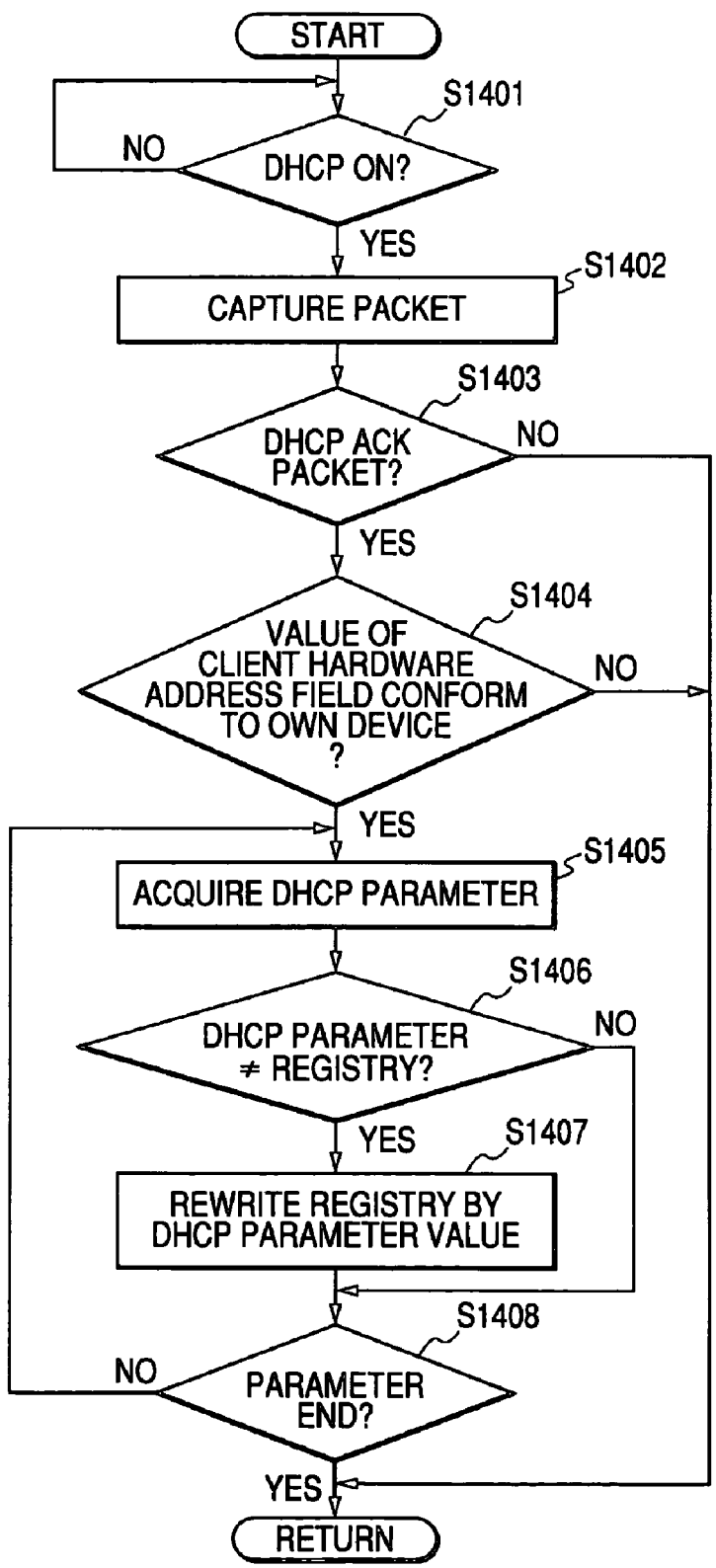
FIG. 14 is a flowchart showing processing executed by a packet capture module 305.

FIG. 14 is a flowchart showing processing which the packet capture module 305 executes. First, the packet capture module 305 determines whether the DHCP client service is activated, i.e., whether the DHCP button 1305 is turned on (step S1401). When the DHCP client service is not activated, then the subsequent processing is not performed.

When the DHCP client service has been activated, the packet capture module 305 monitors the packet sent from the DHCP server, and captures the packet (step S1402). Then, the packet capture module 305 determines whether or not the captured packet is a DHCP ACK packet (step S1403).

When the captured packet is a DHCP ACK packet, the packet capture module 305 determines whether or not the value in the client address hardware field matches the hardware address of the network device 101 (step S1404).

When the value in the client hardware address field 910 does match the hardware address of the network device 101, the packet capture module 305 acquires the DHCP parameters from the DHCP message (step S1405). Here, first, the user IP address 908 shown in FIG. 9 is acquired.

Then, the packet capture module 305 judges whether the acquired value is different from the key value in the IP Address registry (step S1407). When it is different, the packet capture module 305 sets the acquired user IP address as the key value of the IP Address registry (step S1407). By doing this, even if the IP Address registry key value is other than "0.0.0.0", the IP address acquired from the DHCP server will reflect the network device 101.

The packet capture module 305 determines whether or not all the DHCP parameters have finished being read out (step S1408). Then, the subnet mask value in FIG. 10 is acquired (step S1405), and the acquired subnet mask value is compared against the Subnet Mask registry key value (step S1406). If they do not match, then the Subnet Mask registry key value is rewritten with the acquired subnet mask value (step S1407). Furthermore, the gateway address is handled similarly. The gateway address in FIG. 10 is acquired (step S1405), and the acquired gateway address is compared against the value in the Default Gateway registry (step S1406). If those do not match, then the acquired gateway address is registered into the Default Gateway registry (step S1407).

After the steps S1105 through S1107 are performed for all the necessary DHCP parameters, the processing ends.

Second Embodiment

Program code and related data for achieving the present invention can be stored on a Floppy® disk (FD) or CD-ROM, and may be provided therefrom to a computer. Furthermore, the objects of the present invention can also be achieved when a storage medium storing software (control program) program code for achieving the functions of the above-mentioned embodiment is provided to a computer or image processing device, and the central processing unit (CPU) of that computer or image processing device reads out and executes the program code stored on the storage medium. A common method of providing the program and data to the computer is to store it on a Floppy® disk, and provide it for example to the computer main unit (via a Floppy® disk drive). In this case, the program code itself which is read out from the storage medium achieves the functions of the above-mentioned embodiment, and the storage medium storing the program code is the construction of the present invention.

As the storage medium for providing the program code, in addition to a Floppy® disk or hard disk, it is also possible to use, for example, an optical disk, an optico-magnetic disk, a CD-ROM, a CD-R, DVD-ROM, DVD±ROM/RW, DVD-RAM, magnetic tape, a non-volatile memory card, ROM, or the like. Furthermore, it goes without saying that the present invention includes not only the case where the functions of the above-mentioned embodiment are achieved by executing the program code that was read out by the computer or the image processing device, but also cases where, based on instructions from the program code, the Operating system (OS) or the like that is running on the computer or image processing device executes a part or all of the actual processing, and this processing achieves the functions of the above-mentioned processing. Additionally, it goes without saying that the present invention covers cases where the program code that was read out from the storage medium is written into a function expansion board inserted into the computer or image processing device, or to a function expansion unit connected to the computer or image processing device, and then, based on instructions from that program code, a CPU or the like furnished to that function expansion board or function expansion unit performs a part or all of the actual processing, and this processing achieves the functions of the above-mentioned embodiment.

In the present invention, even if setting values which are stored in the storage area for storing setting values designated by the user, are not fixed values, and there is a restriction that setting values acquired by using specific protocols cannot be reflected in the network communication, when using setting values that were acquired by using the specific protocols, those setting values that were acquired from the server using the specific protocols can be stored into the above-mentioned storage area. As a result, the setting values acquired using the specific protocols can in effect be reflected in the network communication.

This application claims priority from Japanese Patent Application No. 2004-213017 filed on Jul. 21, 2004, which is hereby incorporated by reference herein.

What is claimed is:

1. An information processing device, comprising:
a first storage unit that stores an indication of whether an external setting value is to be used in network communication, the external setting value being acquired from an external device using a protocol;
a second storage unit that stores a setting value designated by a user;
a third storage unit that stores the external setting value acquired from the external device using the protocol;
a first setting unit that acquires the external setting value from the external device using the protocol, and stores the external setting value into the third storage unit;
a network communication unit that, when the indication of whether the external setting value is to be used in network communication indicates that the external setting value is not to be used, or, when the setting value stored in the second storage unit is not a fixed setting value, performs network communication in accordance with the setting value stored in the second storage unit, and when the setting value stored in the second storage unit is the fixed setting value, and when the indication of whether the external setting value is to be used in network communication indicates that the external setting value is to be used, performs network communication in accordance with the external setting value stored in the third storage unit; and
a second setting unit that, when the setting value stored in the second storage unit is not the fixed setting value, and, when the indication of whether the external setting value is to be used in network communication indicates that the external setting value is to be used, replaces the setting value stored in the second storage unit with the external setting value acquired from the external device.

2. The information processing device according to claim 1, wherein:
the first setting unit uses the protocol to send a request for the external setting value to the external device; and
before the first setting unit receives a response to the request, the second setting unit captures the response, and stores the external setting value included in the captured response into the second storage unit.

3. The information processing device according to claim 1, further comprising:
a designating unit that enables the user to designate the setting value stored in the second storage unit; and
a selecting unit that enables the user to select whether to acquire the setting value by the first setting unit.

4. The information processing device according to claim 1, wherein the setting value stored in the second memory unit includes an Internet Protocol (IP) address value, and wherein the external setting value stored in the third memory unit includes an IP address value.

5. The information processing device according to claim 1, wherein the setting value stored in the second memory unit includes a plurality of setting values including an IP address value, a subnet mask value, and a default gateway value, and wherein the external setting value stored in the third memory unit includes a plurality of external setting values including an IP address value, a subnet mask value, and a default gateway value.

6. The information processing device according to claim 1, wherein the fixed setting value is 0.0.0.0.

7. An information processing method used in an information processing device that includes a computer processor, storing an indication of whether an external setting value is to be used in network communication in a first storage area, the external setting value being acquired from an external device using a protocol, that performs network communication in accordance with a setting value designated by a user and stored in a second storage area, or performs network communication in accordance with the external setting value acquired from the external device using the protocol and stored in a third storage area, the method comprising:

sending to the external device a request using the protocol to acquire the external setting value from the external device, and storing the acquired external setting value into the third storage area;

when the indication of whether the external setting value is to be used in network communication indicates that the external setting value is not to be used, or, when the setting value stored in the second storage area is not a fixed setting value, performing network communication in accordance with the setting value stored in the second storage unit, and, when the indication of whether the external setting value is to be used in network communication indicates that the external setting value is to be used, and, when the setting value stored in the second memory area is the fixed setting value, performing network communication in accordance with the external setting value stored in the third storage area; and when the setting value stored in the second storage area is not the fixed setting value, and, when the indication of whether the external setting value is to be used in network communication indicates that the external setting value is to be used, replacing the setting value stored in the second storage area with the external setting value acquired from the external device, wherein the replacing is performed, at least in part, by the computer processor.

8. The information processing method according to claim 7, wherein the setting value stored in the second memory area includes an Internet Protocol (IP) address value, and wherein the external setting value stored in the third memory area includes an external IP address value.

9. The information processing method according to claim 7, wherein the setting value stored in the second memory area includes a plurality of setting values including an address value, a subnet mask value, and a default gateway value, and wherein the external setting value stored in the third memory area includes a plurality of setting values including an address value, a subnet mask value, and a default gateway value.

10. The information processing method according to claim 7, wherein the fixed setting value is 0.0.0.0.

* * * * *